Figure 1:
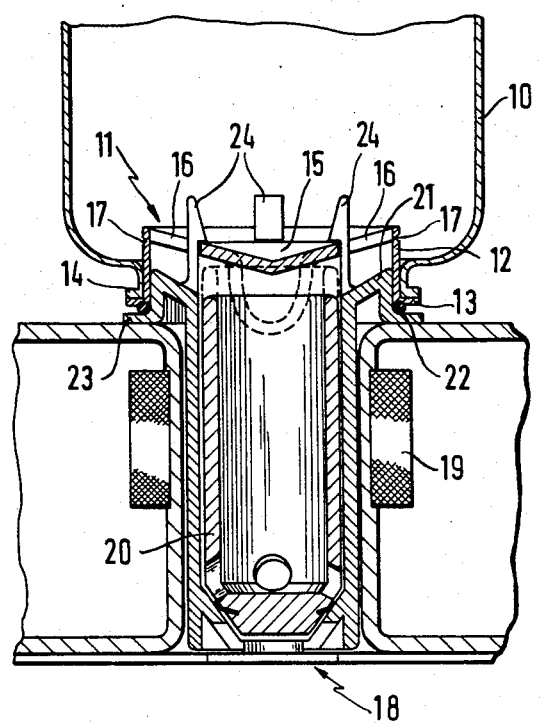

United States Patent [19]

Nelzow et al.

[11] Patent Number: 4,496,078
[45] Date of Patent: Jan. 29, 1985

[54] CONTAINER, ESPECIALLY A DISPOSABLE CONTAINER FOR BEVERAGE CONCENTRATES, WITH A PREFERABLY MAGNETICALLY-ACTUATED REUSABLE MEASURER ATTACHED TO THE OPENING OF THE CONTAINER

[75] Inventors: Hartmann Nelzow; Färber Karlheinz, both of Giengen; Anton Deininger, Bachhagel, all of Fed. Rep. of Germany

[73] Assignee: Bosch-Siemens Hausgerate GmbH, Stuttgart, Fed. Rep. of Germany

[21] Appl. No.: 299,639

[22] Filed: Sep. 4, 1981

[30] Foreign Application Priority Data

Sep. 9, 1980 [DE] Fed. Rep. of Germany ....... 3033874

[51] Int. Cl.$^3$ ............................................. B67B 7/24
[52] U.S. Cl. ........................................ 222/87; 222/88; 222/89; 222/439; 222/453; 141/330
[58] Field of Search ........................ 222/82, 87, 89, 90, 222/147, 153, 325, 453, 504, 525, 522, 88, 81, 434, 438, 439; 141/19, 329, 330; 206/222; 137/68 R

[56] References Cited

U.S. PATENT DOCUMENTS 1,657,782  1/1928  Berg ..................................... 141/330
3,200,994  8/1965  Levinson et al. ..................... 222/82
4,109,829  8/1978  Kuckens et al. ................ 222/453 X

FOREIGN PATENT DOCUMENTS 2754534  12/1977  Fed. Rep. of Germany ...... 222/501

Primary Examiner—Joseph J. Rolla
Assistant Examiner—G. Pyryt
Attorney, Agent, or Firm—Herbert L. Lerner; Laurence A. Greenberg

[57] ABSTRACT

Container assembly for beverage concentrates, including a container having an opening formed therein, a carrier disposed in the opening, a membrane-type seal disposed in the opening sealing the carrier to the container, a reusable measuring device having an end section for attachment to the container at the opening, at least one tab projecting from the end section for punching through the seal, and at least one barbed hook disposed on the at least one tab being solidly snappable-in on the carrier when attaching the measuring device to the container at the opening, the measuring device being detachable from the container after being attached exclusively by pulling the carrier from the opening.

9 Claims, 2 Drawing Figures

U.S. Patent  Jan. 29, 1985  4,496,078

CONTAINER, ESPECIALLY A DISPOSABLE CONTAINER FOR BEVERAGE CONCENTRATES, WITH A PREFERABLY MAGNETICALLY-ACTUATED REUSABLE MEASURER ATTACHED TO THE OPENING OF THE CONTAINER

The invention relates to a container, especially a disposable container for beverage concentrates, with a preferably magnetically-actuated, reusable measurer, attached to the opening of the container, the end section of the measurer adjoining the container opening being provided with at least one projection for punching through a membrane-like seal seated in the container opening.

As is known in the pertinent art, there exist containers of this type, which in most cases can be reused without any difficulties, if after consuming their original contents and removing a measurer which is usually mounted at the opening by a screw connection, they are refilled and in due course closed by a subsequent reattachment of the measurer. There is a danger associated with such devices however, in that instead of a high-grade concentrate having specific quality properties, one of a lower quality is filled into the container by mistake or even misuse. For the consumer therefore, with containers of the disclosed type, the expected uniform quality of a beverage prepared in an automatic beverage machine is not always guaranteed.

Aside from the above, there is the fact that with prior art containers there is a danger present of polluting the concentrate by inexpert refills, so that the consumption of a beverage prepared in that way can occasionally be a health hazard. It is accordingly an object of the invention to provide a container, especially a disposable container for beverage concentrates, with a preferably magnetically-actuated, reusable measurer attached to the opening of the container, which overcomes the hereinafore-mentioned shortcomings of the heretofore-known devices of this general type, and to do so in such a way that any inexpert and fraudulent manipulations of its contents are safely eliminated, and only the applicable original concentrate can be used for preparing beverages in an automatic beverage machine. With the foregoing and other objects in view there is provided, in accordance with the invention, a container assembly for beverage concentrates, comprising a container, especially a disposable container, having an opening formed therein, a carrier disposed in the opening, a membrane-type seal disposed in the opening sealing the carrier to the container, a reusable measuring device, which is preferably magnetically actuated, having an end section for attachment to the container at the opening, at least one tab projecting from the end section for punching through the seal, and at least one barbed hook disposed on the at least one tab being solidly snappable-in on the carrier when attaching the measuring device to the container at the opening, the measuring device being detachable from the container after being attached exclusively by pulling or ripping the carrier from said opening.

Based on developing a container according to the invention, the ripout of the carrier produced by the measurer detachment safely avoids any inexpert or even repeated misuse of the container because of the carrier destruction after its single usage. Such a container can therefore be reused only if it is filled in a plant authorized to sell the original concentrate and is provided with a seal having a new carrier.

In accordance with another feature of the invention, the seal has a rim formed thereon, the barbed hook has a notch formed therein, and the carrier is in the shape of a star having a centrally-disposed solid plate snappable into the notch and having ridges extended substantially radially from the plate to the rim.

In accordance with a further feature of the invention, the ridges have prefabricated breaking points formed therein, preferably at the container opening edge, the breaking points being destroyed upon removal of the measuring device.

In accordance with an added feature of the invention, the membrane-type seal has segmental-type membrane sealing interspaces between the ridges, the rim and the plate.

In accordance with an additional feature of the invention, there is provided a cylindrical ram having a hollow space formed therein, being axially shiftable in the measuring device into an impact position and having an opening formed therein at an impact side thereof, the plate being in the form of an impact stop and seal for the opening formed in the ram.

In accordance with again another feature of the invention, the plate has a cavity centrally provided therein forming a portion of the plate extended toward the hollow space in the ram, the portion being partially disposed in the hollow space in the ram when the ram is in the impact position.

In accordance with again a further feature of the invention, the measuring device has a cylindrical projection formed thereon, and the seal has a rim formed thereon at the opening being fitted against the cylindrical projection.

In accordance with a concomitant feature of the invention, the cylindrical projection has a flange formed thereon being tightly applied to the rim.

Other features which are considered as characteristic for the invention are set forth in the appended claims.

Although the invention is illustrated and described herein as embodied in container, especially a disposable container for beverage concentrates, with a preferably magnetically-actuated reusable measurer attached to the opening of the container, it is nevertheless not intended to be limited to the details shown since various modifications and structural changes may be made therein without departing from the spirit of the invention and within the scope and range of equivalents of the claims.

Figure 2:
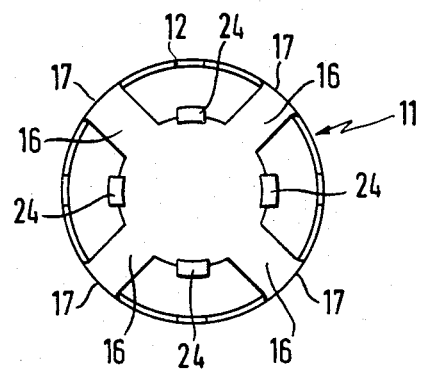

The construction and method of operation of the invention, however, together with additional objects and advantages thereof will be best understood from the following description of specific embodiments when read in connection with the accompanying drawings, in which:

FIG. 1 is a simplified, fragmentary, diagrammatic cross-sectional view of a container for a beverage concentrate with a downwardly-pointed opening, and a seal seated in its opening, on which a measurer is mounted; and FIG. 2 is a top-plan view of the seal and measurer component parts.

Referring now to the figures of the drawing and first particularly to FIG. 1 thereof, it is seen that a container for a beverage concentrate which is designated with reference numeral 10, is formed in the shape of a plastic bottle, and that in the downwardly pointed opening thereof, a seal 11 is seated. The seal which projects into the interior of the container 10 has a cylindrical rim 12, which is equipped with a flange 13 abutting the opening rim of the container 10, and the rim 12 is interconnected with the flange 13 by a rim-bordering metal ring 14. The end of the rim 12 of the seal 11 facing away from the flange 13 supports a carrier, which is constructed in the shape of a star carrier with a centrally-seated solid plate 15. Extending from the plate 15 are radially-disposed ridges 16, the outer ends of which are seated at the cylindrical rim 12 of the seal 11. For purposes of simplification, the ridges 16 are shown as lying in the drawing plane. At the transition of the ridges 16 to the rim 12 of the seal 11, a respective prefabricated breaking point 17 is located, the function of which will be explained further below. The interspaces between the ridges 16, the plate 15, and the rim of the seal 11 are sealed by segmental-type sealing membranes, which for the sake of simplicity are omitted in the drawing. The sealing membranes are used for the hermetic closure of the interior of the container 10.

In the opening of the container 10 provided with the seal 11, a measurer or measuring device 18 is seated. The measurer is generally constructed as a hollow cylinder equipped in its interior with a ram 20 that is operationally guided by an electromagnet 19. The adjoining end of the container 10 is equipped with a cylindrical projection 21, which is plugged into the cylindrical rim 12 of the seal 11 seated in the container opening, under a tight fit. The container 10 is further provided with a flange 23 tightly applied against the opening rim of the container 10 with an intermediately-disposed O-ring 22.

At the end of the measurer adjoining the container 10, the measurer is equipped with a plurality of projections 24, at the free ends of which barb-type holder devices in the form of spring-loaded notch-hooks are seated. When attaching the measurer 18 to the container 10, the projections 24 are used for punching through the seal 11 in the area of the sealing membranes seated between the ridges 16, and then on a deeper plug-in of the measurer they are used for punching into the opening of the container 10 for a spring-loaded lock-in at the rim of solid plate 15 and thus for anchoring the measurer so as to be ready for use on the container 10. In the illustrated embodiment example, the plate 15 serves as an impact stop and a seal for the hollow cylindrical ram 20 being axially shiftable in the measurer 18, the ram being open at the end thereof turned toward the plate 15. Upon excitation of the electromagnet 19, the ram 20 is lifted into an impact position shown in the drawing by a broken line. It thereby impacts its top edge against the plate 15.

As is equally indicated in FIG. 1 by broken lines, the plate 15 can be equipped at its center with a cavity which is disposed against the hollow space of the ram 20, and which projects from above into the hollow space of the ram 20. With the illustrated and described embodiment example, the respective volume of the beverage concentrate dispensed by the measurer during one stroke can be varied in a simple way, i.e. by varying the construction of the cavity. Thus it is feasible to use the same measurer for obtaining various volumes with various beverage concentrates. By deviating from the shown and described embodiment, instead of a star carrier, any other carrier construction can also be provided, as long as it is suitable for giving the measurer 18 applied to the container 10 a solid base and for preventing an unauthorized and fraudulent reuse of the container 10 subsequent to consuming its original contents.

There is claimed:

1. Container mounting and metered dispensing assembly for beverage concentrates, comprising a container having an opening formed therein, a seal including a carrier disposed in said opening and a sealing membrane also disposed in said opening and, together with said carrier, sealing said opening of said container, a reusable measuring device disposed coaxially with said carrier and having an end section for attachment to said container at said opening, at least one tab projecting from said end section for punching through said seal, and at least one barbed hook disposed on said at least one tab and being solidly snappable onto said carrier when attaching said measuring device to said container at said opening, said measuring device being detachable from said container, after being attached to said container, exclusively by destructively ripping said carrier from said opening, said seal having a rim formed thereon, said barbed hook having a notch formed therein, and said carrier being in the shape of a star having a centrally-disposed solid plate snappable into said notch and having ridges extending substantially radially from said plate to said rim.

2. Container assembly according to claim 1, wherein said ridges have prefabricated breaking points formed therein, said breaking points being destroyed upon removal of said measuring device.

3. Container assembly according to claims 1 or 2, wherein said sealing membrane is formed in segments sealing interspaced between said ridges, said rim and said plate.

4. Container assembly according to claim 1 including a cylindrical ram having a hollow space formed therein, said ram being axially shiftable in said measuring device into an impact position and having an opening formed therein at an impact side thereof.

5. Container assembly according to claim 1, including a cylindrical ram having a hollow space formed therein, said ram being axially shiftable in said measuring device into an impact position and having an opening formed therein at an impact side thereof, said plate being in the form of an impact stop and seal for said opening formed in said ram.

6. Container assembly according to claim 5, wherein said plate has a cavity centrally provided therein forming a portion of said plate extended toward said hollow space in said ram, said portion being partially disposed in said hollow space in said ram when said ram is in said impact position.

7. Container mounting and metered dispensing assembly for beverage concentrates, comprising a container having an opening formed therein, a seal including a carrier disposed in said opening and a sealing membrane also disposed in said opening and, together with said carrier, sealing said opening of said container, a reusable measuring device disposed coaxially with said carrier and having an end section for attachment to said container at said opening, at least one tab projecting from said end section for punching through said seal, and at least one barbed hook disposed on said at least one tab and being solidly snappable onto said carrier when attaching said measuring device to said container at said opening, said measuring device being detachable from said container, after being attached to said container, exclusively by destructively ripping said carrier from said opening, said measuring device having a cylindrical projection formed thereon, and said seal having a rim formed thereon at said opening, said rim being fitted against said cylindrical projection.

8. Container assembly according to claim 7, wherein said cylindrical projection has a flange formed thereon, said flange being tightly applied to said rim.

9. Container mounting and metered dispensing assembly for beverage concentrates, comprising:
- a container having an opening formed therein;
- a seal including a carrier disposed in said opening, and a sealing membrane also disposed in said opening and, together with said carrier, sealing said opening of said container;
- a reusable measuring device disposed coaxially with said carrier and having an end section for attachment to said container at said opening;
- at least one tab projecting from said end section for punching through said seal;
- at least one barbed hook disposed on said at least one tab and being solidly snappable onto said carrier when attaching said measuring device to said container at said opening, said measuring device being detachable from said container, after being attached to said container, exclusively by destructively ripping said carrier from said opening; and
- a cylindrical ram having a hollow space formed therein, said ram being axially shiftable in said measuring device into an impact position and having an opening formed therein at an impact side thereof, said plate being in the form of an impact stop and seal for said opening formed in said ram and having a cavity centrally provided therein forming a portion of said plate extending toward said hollow space in said ram, said portion being partially disposed in said hollow space in said ram when said ram is in said impact position to thereby control the volume within said measuring device.

* * * * *